United States Patent [19]
Verdier

[11] 3,746,399
[45] July 17, 1973

[54] MONOBLOC WHEEL

[75] Inventor: Henri Verdier, Beauregard-L'Eveque, France

[73] Assignee: Compagnie Generale Des Etablissments Michelin raison socials Michelin & Cie, Clermont-Ferrand (Puy-de-Dome), France

[22] Filed: Dec. 16, 1970

[21] Appl. No.: 98,655

[30] Foreign Application Priority Data
Dec. 26, 1969 France .............................. 6945163

[52] U.S. Cl. ............................................... 301/65
[51] Int. Cl. .............................................. B60b 3/06
[58] Field of Search ............... 301/65, 64 SD, 64 R, 301/63 R

[56] References Cited
UNITED STATES PATENTS
3,549,205  12/1970  Reid ...................................... 305/65
3,428,365  2/1969   French ................................. 301/65
3,659,901  5/1972   Porsche ............................... 301/65
3,153,557  10/1964  O'Brien ............................ 301/6 CS FOREIGN PATENTS OR APPLICATIONS
843,614    3/1939   France .......................... 301/64 SD
1,365,089  5/1964   France ............................... 301/65
1,051,843  12/1966  Great Britain .................... 301/6 CS Primary Examiner—Richard J. Johnson
Attorney—Brumbaugh, Graves, Donohue & Raymond

[57] ABSTRACT

A monobloc wheel has a well-base rim and a disc. The disc comprises a central portion flared in a direction that is axially in and radially out, an intermediate portion lying in the plane of attachment to the hub, and an outer portion flared in a direction that is axially out and radially out. The outer portion is joined to the rim near a rim flange so that the disc buttresses the rim while constituting an extension thereof.

5 Claims, 2 Drawing Figures

PATENTED JUL 17 1973

3,746,399

INVENTOR.
HENRI VERDIER
BY
Brumbaugh, Graves, Donohue & Raymond
his ATTORNEYS

MONOBLOC WHEEL

BACKGROUND OF THE INVENTION

This invention relates to wheels and, more particularly, to novel and highly-effective monobloc wheels made of light alloy, which are intended to mount pneumatic tires and to be used on automotive vehicles.

Light wheels for automotive vehicles are desirable, particularly in the case of vehicles intended for high speed or rapid acceleration. The need for light wheels suggests that they be made of light alloy, and numerous types are already available on the market. In all of these models the shape of the rim is identical to that of the rims of rolled steel wheels, such shape being imposed by the requirements of the mounting and holding of the tire. On the other hand, there is quite a variety of shapes of the wheel disc, and the disc tends more and more to take the place of the hub cap. Manufacture by casting or by die work makes it easy to produce complicated shapes that satisfy esthetic considerations.

Despite the great variety of light-alloy wheels, conventional wheels are not designed in a shape that is well adapted to the use of light alloys and in particular to casting, that is easy to manufacture without defect, particularly foundry defects, and which employs a minimum of metal for maximum strength.

SUMMARY OF THE INVENTION

An object of the invention is to remedy the problems outlined above and in particular to provide a wheel that can be made by casting and that is light, economical, free of foundry defects and very strong, and particularly very resistance to axial forces.

The monobloc wheel in accordance with the invention comprises a conventional well-base rim, also called a drop-center rim, and a disc housed within the rim. The wheel is characterized in that the disc comprises three contiguous portions: a central portion flared in a direction that is axially in and radially out, an intermediate portion radially outside the central portion and lying in a plane of attachment to the hub, and an outer portion radially outside the intermediate portion and flared in a direction that is axially out and radially out. The outer portion joins the rim obliquely near a rim flange so that the disc buttresses the rim while constituting an extension thereof. The inner and outer axial directions are to be understood with reference to the vehicle on which the wheel is to be mounted.

This simple shape, in which the several portions of the disc follow each other and in which the rim follows the disc, is particularly desirable in a product made of cast metal or forged metal; the flow of the metal takes place in a single direction, for instance from the center towards the periphery, or vice versa.

Furthermore, the shape of the buttressing disc, one side of which extends from the rim flange and the other side of which forms a tubular element, increases the resistance of the wheel to axial forces, particularly axial forces directed from the outside of the vehicle towards the inside.

In one particularly simple embodiment, the outer portion of the disc can have the geometrical shape of a cone frustum the generatrix of which is inclined by about 15° to 30° with respect to a plane normal to the cone (or wheel) axis.

It is also possible to provide a number of radial ribs arranged on one and/or the other side of the disc; these ribs facilitate the flow of the metal upon casting and stiffen the disc and the rim. It is also possible to provide in the disc a number of openings in order to reduce the weight of the wheel and to permit flow of air from one side of the disc to the other in order, for instance, to assure better ventilating of the brake members.

The central portion of the disc preferably does not protrude axially from the rim. At its end it may have a part forming a plug and hub cap which can be fastened by any suitable means, such as crimping, force fitting, screwing, etc.

The intermediate portion of the disc, lying in the plane of attachment to the hub and disposed between the central and outer portions of the disc, may advantageously have an extra thickness of metal. It has a number of holes in which there can be force-fitted liners, preferably of steel, into which there are introduced the fastening bolts or pins and on which the centering and locking nuts bear. In another embodiment, one dispenses with the use of the liners, in which case the bolts and the nuts then bear directly on the metal of the disc.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
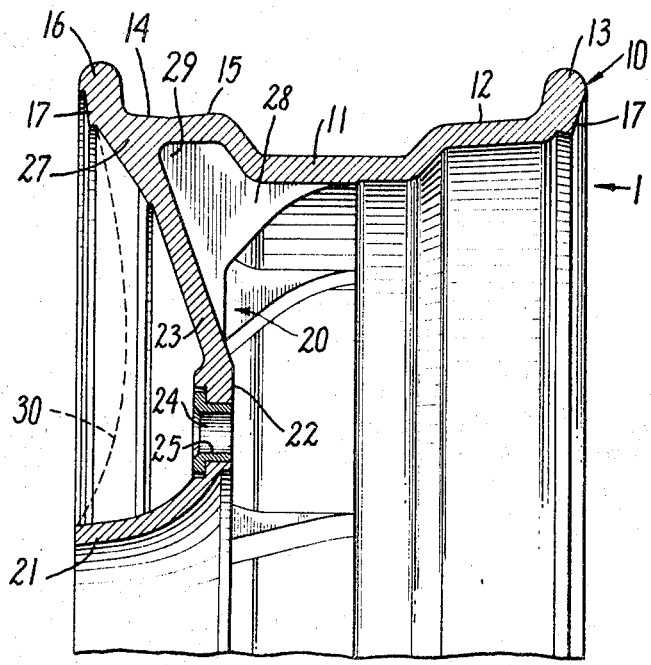
FIG. 1 is a view in radial half section of a preferred embodiment of a wheel in accordance with the invention.
Figure 2:
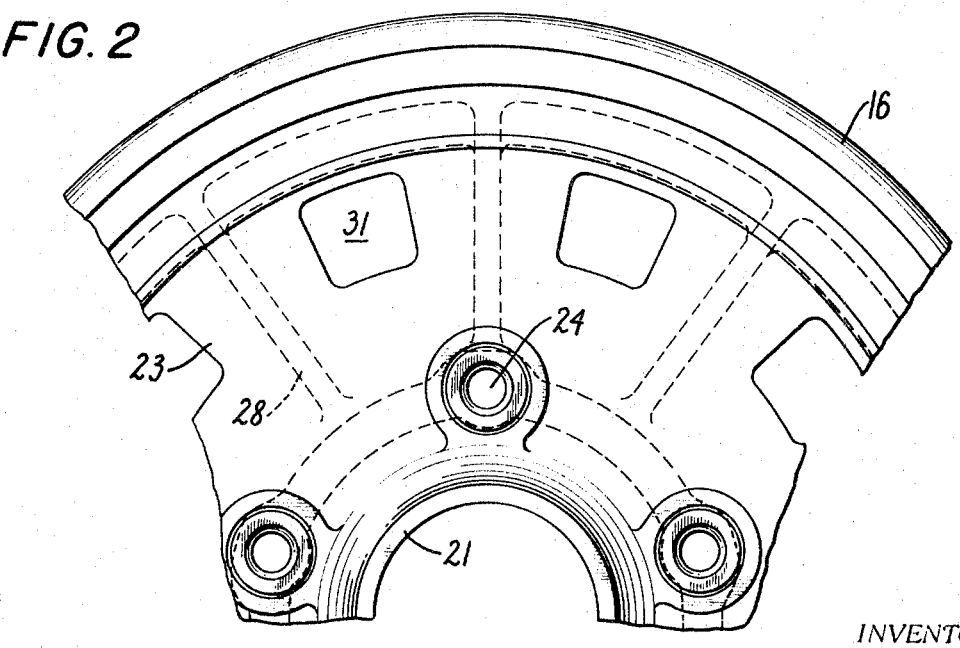
FIG. 2 is a view in elevation of a portion of the disc of the wheel of FIG. 1.

FIGS. 1 and 2 show a cast wheel 1 of light alloy in accordance with the invention. It has a rim 10 and a disc 20.

The rim 10 has a well base 11, an inner bead seat 12 inclined by 5° with respect to the wheel axis, an inner rim flange 13, and an outer bead seat 14 also inclined by 5° with respect to the wheel axis but in the opposite direction. The outer bead seat 14 is extended on the inside by a border 15 inclined by 5° with respect to the wheel axis in the same direction as the bead seat 12. The rim also has an outer rim flange 16. The terminal rim flanges 13 and 16 have in the direction of the axis an angular extension 17 intended to facilitate the fastening of balancing masses (not shown). The rim finally has a valve hole (not shown) to which there corresponds a hole in the disc (also not shown).

The disc 20 comprises a central portion 21 flared in a direction that is axially in and radially out, an intermediate portion 22 lying in the plane of attachment to the hub and an outer frusto conical portion 23 flared in a direction that is axially out and radially out.

The flared central portion 21 does not extend axially beyond the outer rim flange 16. It is of nozzle shape, facilitating the flow of the metal during casting and the buttressing of the intermediate attachment portion 22 and the outer disc portion 23.

The intermediate plane attachment portion 22 has several holes 24 in which there are force-fitted liners 25 intended to receive the attachment bolts, pins and nuts (not shown). The thickness of metal in the intermediate attachment portion is substantially greater than that of the inner portion 21 or the outer disc portion 23, particularly all around the holes 24.

The outer disc portion 23 is integral on one side with the attachment intermediate plane portion 22 and on the other side with the rim 10 at a line 27 substantially in the extension of the rim flange 16, and thus buttresses the rim 10. The outer disc portion 23 is stiffened furthermore by inner ribs 28 which connect it to the rim in the acute angle 29. It may furthermore have outer ribs 30 (shown in dotted line in FIG. 1) located in the extension of some of the inner ribs 28. The ribs 30 connect the rim and all three portions of the disc, including the central portion 21. Finally, the disc 23 may have openings 31 in all or part of the spaces between ribs 28 and 30.

The surface of the disc may be machined or polished in order to improve its appearance, particularly in the region of the disc close to the rim.

The wheel which has thus been described is preferably manufactured by metal casting, the axis of the wheel being vertical and the metal being introduced through the end of the central portion 21 and flowing to the inner rim flange 13. Alternatively, the metal is introduced via the outer rim flange 16, the axis of the wheel being arranged vertically with the rim flange 16 positioned at the top, and the metal flows downward to the inner rim flange 13 and then forms the disc 23 and the central sleeve 21.

Many modifications of the representative embodiments of the invention described herein will readily occur to those skilled in the art. For example, the invention is not limited to a cast metal wheel but relates to a monobloc wheel in which there is continuity of metal in the disc and the rim, irrespective of the method of manufacture. Accordingly, the invention is to be construed as including all the embodiments thereof within the scope of the appended claims.

I claim:

1. A monobloc wheel designed to be made through casting of a light alloy, comprising a well-base rim and a disc radially within and connected to said rim, said rim and disc being made of a cast light alloy, said rim comprising substantially radially extending inner and outer terminal rim flanges and said disc comprising a central portion flared in a direction that is axially in and radially out, an intermediate portion radially outside said central portion, contiguous therewith, and lying in a plane, and an outer portion radially outside said intermediate portion, contiguous therewith, and flared in a direction that is axially out and radially out, and said outer portion being joined to said disc near to and as a continuous conical extension of said outer rim flange, so that said disc buttresses said rim along said outer rim flange, whereby the flow of liquid alloy in a single direction during casting is facilitated.

2. A monobloc wheel according to claim 1 further comprising radial ribs connecting said rim to said disc.

3. A monobloc wheel according to claim 1 further comprising radial ribs connecting said rim to said central portion of said disc.

4. A monobloc wheel according to claim 1 wherein said intermediate portion is formed with an extra thickness as compared to said central and outer portions.

5. A monobloc wheel designed to be made through casting of a light alloy, comprising a well-base rim and a disc radially within and connected to said rim, said rim and disc being made of a cast light alloy, said rim comprising at least one rim flange and said disc comprising a central portion flared in a direction that is axially in and radially out, an intermediate portion radially outside said central portion, contiguous therewith, and lying in a plane, and an outer portion radially outside said intermediate portion, contiguous therewith, and flared in a direction that is axially out and radially out, and said outer portion being joined to said disc near said rim flange, so that said disc buttresses said rim while constituting an extension thereof, whereby the flow of liquid alloy in a single direction during casting is facilitated, said outer portion having the shape of a cone frustum the generatrix of which is inclined by about 15° to 30° with respect to a plane normal to the axis of said wheel.

* * * * *